Sept. 9, 1941.        C. G. KRONMILLER        2,255,732
SWITCHING MECHANISM
Filed April 18, 1938

INVENTOR
Carl G. Kronmiller
BY
George H Fisher
ATTORNEY

Patented Sept. 9, 1941

2,255,732

UNITED STATES PATENT OFFICE 2,255,732

SWITCHING MECHANISM

Carl G. Kronmiller, Minneapolis, Minn., assignor to Minneapolis-Honeywell Regulator Company, Minneapolis, Minn., a corporation of Delaware Application April 18, 1938, Serial No. 202,632

6 Claims. (Cl. 200—84)

This invention relates to condition responsive switches and particularly to float switches.

It is often desirable to mount a float switch directly in the wall of a boiler or other liquid receptacle. The most convenient way to form a pressure tight joint for the float mounting member is to provide that member with pipe threads to engage corresponding threads in the boiler wall. If the float is to actuate a mercury switch, as is often desirable, provision must be made to adjust the switch support in order that the switch fulcrum will be level and that the switch tube will be actuated through the proper angle about its fulcrum to perform its switching function. The usual expedient is to screw the mounting member into the boiler wall until the pipe threads are as tight as possible and at the same time the switch support is properly levelled. This means that the threaded joint is not always tight and leaks frequently develop around the joint.

An object of the present invention is to provide a device of the above character in which the mounting member may be screwed up tightly into the boiler wall and in which the mercury switch support may be adjusted relative to the mounting member to properly level the switch.

Another object is to provide a switch in conjunction with a condition responsive device which may be mounted on a boiler or other fluid container as a unit but which provides for levelling of the switch after the unit is installed.

Another object is to provide a float switch in which the float pivot is adjustable, for purposes of levelling, with respect to the float and the flexible float seal.

Another object is to provide a float switch in which a mercury switch pivot and a float pivot are adjustable together relative to the float and liquid container to level the two pivots on installation.

Another object is to provide an improved mercury switch support and actuating mechanism.

Other objects will become apparent to those skilled in the art from the accompanying specification, appended claims, and drawing, in which:

Figure 3:
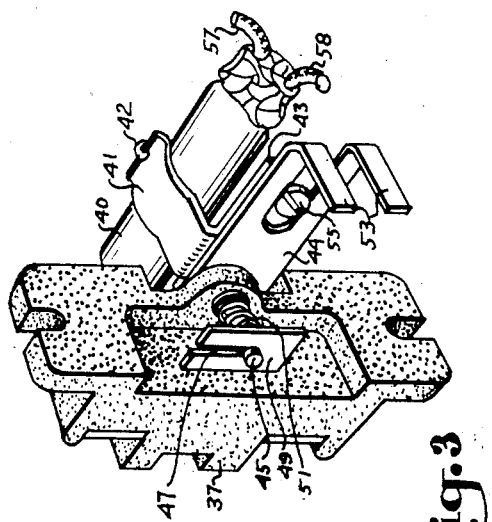
Figure 3 is a perspective view of the terminal block and mercury switch shown in Figure 2.

The invention, as shown, incorporates a float switch of the type which screws directly into the wall of a boiler and which may serve to cut off the supply of heat to the boiler if the level of water drops to a dangerous degree.

A hollow mounting plug 10 is shown screwed into the iron wall 11 of a boiler. A liquid tight joint is formed between the plug 10 and the boiler wall 11 by means of pipe threads 12. The outer end of the mounting plug 10 may be suitably shaped so that the pipe threads 12 may be readily tightened. A hollow metal float 14 extends from within the mounting plug 10 into the interior of the boiler. A flexible metal bellows 15 is soldered or otherwise suitably secured at its inner end to the float 14. At its outer end bellows 15 is soldered to a plate 16. Plate 16 is secured to mounting plug 10 by screws 17 and a gasket 18 is interposed between plate 16 and the mounting plug to insure a liquid and pressure tight seal. A float guard 20 surrounds the float 14 interiorly of the boiler. A plurality of holes 21 are distributed on the float guard and it is through these holes that water enters the float chamber. Holes 21 so restrict the flow of water to and from the float so that the effects of boiler surge are minimized. Float guard 20 is secured to mounting plug 10 by pressing into the groove 22.

A cylindrical supporting member 25 is held in mounting plug 10 by washers 26 which press against ridge 27 which is expanded on the inner end of supporting member 25. Washers 26 are secured in place by screws 28. A circular groove is provided in mounting plug 10 to correspond to the expanded portion 27 of mounting member 25.

In order to provide a pivot for the float, a bracket 30 is secured to the flat base 31 of supporting member 25. Bracket 30 extends through an opening in base 31 to a point at approximately the center of bellows 15. At this point bracket 30 supports a pivot 32 for a float arm 33. At its inner end float arm 33 is screwed into a collar 34 which is rigidly attached to float 14. For a purpose to be hereinafter pointed out arm 33 is not tightly screwed into collar 34. Float arm 33 extends outwardly through the opening in base 31 of supporting member 25 to actuate a mercury switch.

Figure 2:
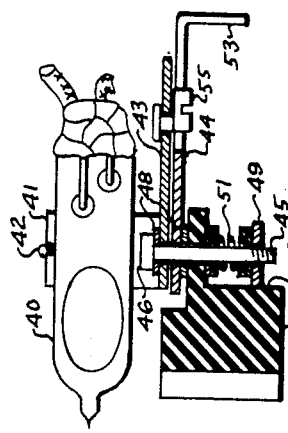
Figure 2 is a horizontal section taken on line 2—2 of Figure 1.
Figure 1:
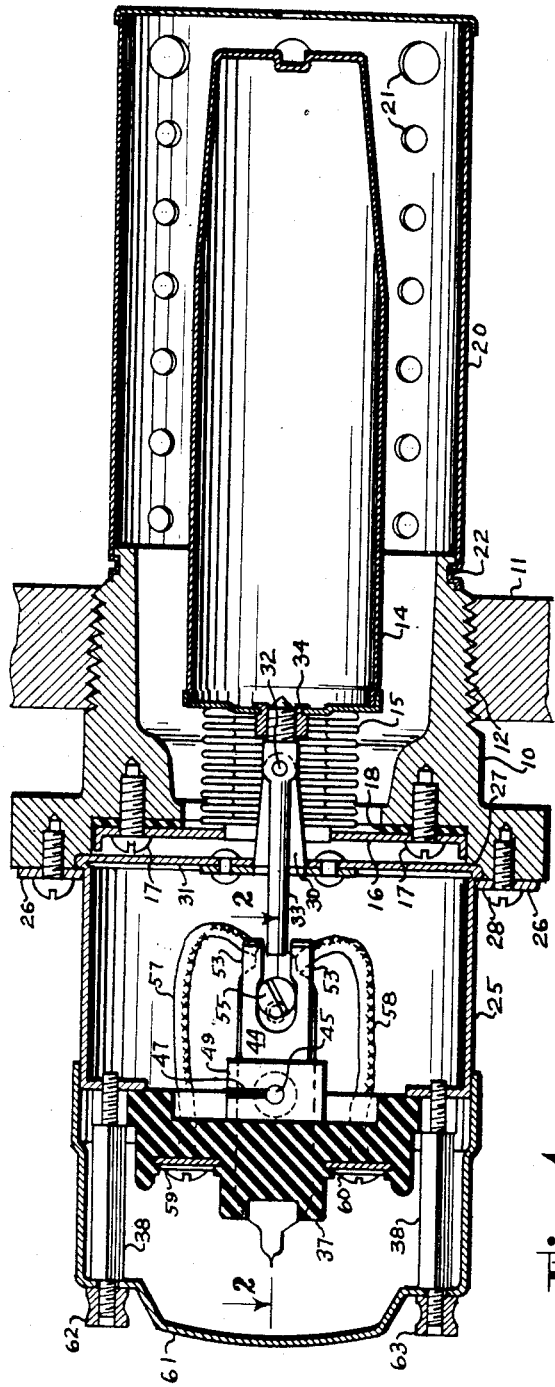
Figure 1 is a vertical section of a float switch.

The construction of the mercury switch, mercury switch support, and terminal block is best shown in Figures 2 and 3. In Figure 2 the clearance between several of the parts is shown somewhat exaggerated for the sake of clarity. Terminal block 37 is moulded from any suitable insulating material and is held in place on supporting member 25 by screw studs 38. A conventional mercury switch 40 is held by a metal clip 41 which is secured to the glass tube of the switch by wire 42. A flat extension 43 is integral with clip 41 and extends parallel to mercury switch 40. Lever 44 lies flat against extension 43. A pin 45 having a head 46 passes through extension 43, lever 44, and a portion of the terminal block 37. Interposed between the head 46 and extension 43 and also between lever 44 and terminal block 37 are friction washers 48. Pin 45 is tightly screwed into a slotted rectangular washer 49 so that it may not rotate therein. Slot 47 is provided in washer 49 in order that washer 49 may be bent to tightly engage pin 45. One of the straight edges of washer 49 lies along a flat portion 50 of terminal block 37 to prevent rotation of washer 49. Pin 45 and its head 46 are likewise prevented from rotating since pin 45 is tightly secured to washer 49. A compression spring 51 surrounding pin 45 is placed between rectangular washer 49 and terminal block 37. Spring 51 therefore biases pin 45 in a direction to force head 46 against friction washers 48, lever 44, and extension 43. Since pin 45 is held stationary the tendency of the friction between the pin, washers 48, and lever 44 is to maintain the mercury switch in whatever position it is placed.

Lever 44 extends in a direction toward float arm 33 and has spaced projections 53 extending above and below the outer end of float arm 33. It should be noted that the distance between spaced projection 33 is greater than the diameter of the outer end of float arm 33. While float guard 20 minimizes greatly the effect of boiler surge on the float, small vertical movements of the float may nevertheless be transmitted to the float arm 33. It is the purpose of the lost motion connection formed by spaced projections 53 and float arm 33 and of the friction mounting of the mercury switch to eliminate the effect of irregular movements of the float on the mercury switch. Float arm 33 may be moved a distance equal to the clearance between it and the space projections 53 without tilting the mercury switch, meanwhile the friction device has maintained the switch in its previous position.

Small adjustments in the relation between lever 44 and extension 43 may be made by adjusting an eccentric 55 which is frictionally pivoted in extension 43 and has a slotted head extending between the spaced projections 53.

Lead wires 57 and 58 extend from mercury switch 40 to metal terminals 59 and 60 on the terminal block 37. A cover 61 for the supporting member 25 and mercury switch is held in place on screw studs 38 by nuts 62 and 63.

Since it is desirable to have changes in the level of liquid within the boiler actuate the float in a vertical plane, pivot 32 for float arm 33 should be horizontal. Likewise the mercury switch 40 is designed to operate when tilted in a vertical plane. Consequently the pin 45 supporting the mercury switch should be horizontal. Float arm pivot 32 and mercury switch pivot pin 45 are both rigidly secured to supporting member 25 in parallel relation so that if supporting member 25 is rotated in mounting plug 10, pivot 32 and pin 45 will be similarly rotated. In order that pipe threads 12 may form a liquid and pressure tight joint it is necessary that mounting plug 10 be screwed tightly into boiler water 11. When this is done the mounting plug 10 may have been rotated to any angle with respect to boiler wall 11. Consequently it is necessary to provide a means of levelling the float arm pin 32 and mercury switch pin 45. It is also necessary that the mercury switch be right side up. With the structure of the present invention it is merely necessary, once the mounting plug is tight to loosen screws 28 so that supporting member 25 may be rotated in the mounting plug 10, to rotate supporting member 25 until the mercury switch pivot pin 45 and float pivot 32 are properly levelled and again tighten screws 28. As previously mentioned, float arm 33 is not tightly screwed into collar 34 on float 14. This allows the arm 33 to be turned somewhat in either direction with respect to the float as mercury switch 40 is being levelled.

In the instrument described the float 14 is capable of tilting the mercury switch 40 to both "on" and "off" positions. By removing the lower of the two spaced projections 53 and providing manual means to tilt the mercury switch 40 to "on" position, a low water cut-off of the manual reset type would be provided since the float could operate only to open an electric circuit through mercury switch 40.

It will be seen that a float switch has been provided in which the float pivot and mercury switch pivot may be readily adjusted with respect to the mounting members in order to level the pivots, and a mercury switch actuating mechanism has been provided in which all small movements of the switch actuating member are not transmitted to the mercury switch.

While one embodiment of the invention has been described, it is to be understood that the invention is to be limited only by the scope of the appended claims.

I claim as my invention:

1. In a liquid level control comprising a relatively non-adjustable float universally flexibly secured to a screw plug mounting member, and a rod movable by said float in accordance with changes in the level of a liquid, the combination of; said screw plug mounting member adapted to be screwed into a liquid container adjacent the normal liquid level therein, an annular shoulder on said plug on the side exterior to the container, an adjustable member having a circular portion for registry with said shoulder, securing means between said member and said shoulder, said member being adjustable with relation to said shoulder, and switch means having a critical operating angle depending upon its position relative to the direction of the force of gravity, said switch means being mounted upon said adjustable member so that by moving said member said switch means can be adjusted.

2. In a liquid level control comprising a relatively non-adjustable float universally flexibly secured to a screw plug mounting member, and a rod movable by said float in accordance with changes in the level of a liquid, the combination of; said screw plug mounting member adapted to be screwed into a liquid container adjacent the normal liquid level therein, an annular shoulder on said plug on the side exterior to the container, an adjustable member having a peripheral flange fitting into said shoulder, securing means between said flange and said shoulder, said securing means being adapted to be loosened so that said adjustable member can be moved relatively to said shoulder and tightened to prevent movement relatively therebetween, a block carried by said adjustable member, and a mercury tube switch having a critical operating angle depending upon its position relative to the direction of the force of gravity, said switch being associated with said block in such a manner that by moving said adjustable member said switch can be adjusted.

3. In a liquid level control comprising a relatively non-adjustable float universally flexibly secured to a screw plug mounting member, and a rod movable by said float in accordance with changes in the level of a liquid, the combination of; said screw plug mounting member adapted to be screwed into a liquid container adjacent the normal liquid level therein, an annular shoulder on said plug on the side exterior to the container, an adjustable member having a peripheral flange fitting into said shoulder, securing means between said flange and said shoulder, said securing means being adapted to be loosened so that said adjustable member can be moved relatively to said shoulder and tightened to prevent movement relatively therebetween, a block carried by said adjustable member, and a mercury tube switch having a critical operating angle depending upon its position relative to the direction of the force of gravity, said switch being associated with said block in such a manner that by moving said adjustable member said switch can be adjusted, mounting means for said switch including a frictionally mounted pivoted member having an operating arm, and a bracket having an angularly adjustable pivot for said float operated rod, said pivots being parallelly arranged so that the motion of said float will be transferred to said switch by said operating arm.

4. In a liquid level control comprising a relatively non-adjustable float universally flexibly secured to a screw plug mounting member, and a rod movable by said float in accordance with changes in the level of a liquid, the combination of; said screw plug mounting member adapted to be screwed into a liquid container adjacent the normal liquid level therein, an annular shoulder on said plug on the side exterior to the container, an adjustable member having a circular portion for registry with said shoulder, securing means between said member and said shoulder, said member being adjustable with relation to said shoulder, and switch means having a critical operating angle depending upon its position relative to the direction of the force of gravity, said switch means being mounted upon said adjustable member so that by moving said member said switch means can be adjusted, mounting means for said switch including a frictionally mounted pivot member having an operating arm, and a bracket having an angularly adjustable pivot for said float operated rod, said pivots being parallelly arranged so that the motion of said float will be transferred to said switch by said operating arm.

5. In a liquid level control comprising a relatively non-adjustable float universally flexibly secured to a mounting member, and a rod movable by said float in accordance with changes in the level of a liquid, the combination of; a switch means having a critical operating angle depending upon its positions relative to the direction of the force of gravity, mounting means for said switch means, an adjustable member associated with said mounting means, and a securing means for said adjustable member, said adjustable member being adapted to be moved to such a position that said switch means can operate across its critical operating angle to perform its controlling function, said mounting means for said switch including a frictionally mounted pivoted member having an operating arm, and a bracket having an angularly adjustable pivot for said float operated rod, said pivots being parallelly arranged so that the motion of said float will be transferred to said switch by said operating arm.

6. In a liquid level control comprising a relatively non-adjustable float universally flexibly secured to a mounting member, and a rod movable by said float in accordance with changes in the level of a liquid, the combination of; said mounting member adapted to be secured to a liquid container in any one of several angular positions adjacent the normal liquid level therein, a circular shoulder on said mounting member on the side exterior to said container, an adjustable member having a circular portion for registry with said shoulder, securing means for securing said adjustable member and said shoulder, said adjustable member being adjustable with relation to said shoulder, and switch means having a critical operating angle depending upon its position relative to the direction of the force of gravity, said switch means being mounted upon said adjustable member so that by moving said member said switch means can be adjusted.

CARL G. KRONMILLER.